United States Patent
Moulin et al.

(10) Patent No.: US 10,822,169 B2
(45) Date of Patent: Nov. 3, 2020

(54) ORDER PICKING SYSTEM

(71) Applicant: EXOTEC SOLUTIONS, Lille (FR)

(72) Inventors: Romain Moulin, Lille (FR); Renaud Heitz, Villeneuve d'Ascq (FR)

(73) Assignee: EXOTEC SOLUTIONS, Lille (FR)

( * ) Notice: Subject to any disclaimer, the term of this patent is extended or adjusted under 35 U.S.C. 154(b) by 0 days.

(21) Appl. No.: 16/488,818

(22) PCT Filed: Apr. 9, 2018

(86) PCT No.: PCT/EP2018/059024
§ 371 (c)(1),
(2) Date: Aug. 26, 2019

(87) PCT Pub. No.: WO2018/189110
PCT Pub. Date: Oct. 18, 2018

(65) Prior Publication Data
US 2020/0180863 A1 Jun. 11, 2020

(30) Foreign Application Priority Data

Apr. 12, 2017 (FR) ...................................... 17 53183

(51) Int. Cl.
*B65G 1/04* (2006.01)
*B65G 1/06* (2006.01)
*B65G 1/137* (2006.01)

(52) U.S. Cl.
CPC ........... *B65G 1/0492* (2013.01); *B65G 1/065* (2013.01); *B65G 1/1378* (2013.01); *B65G 2203/0208* (2013.01)

(58) Field of Classification Search
CPC .................................................. B65G 1/0492
See application file for complete search history.

(56) References Cited

U.S. PATENT DOCUMENTS

2016/0355337 A1* 12/2016 Lert ..................... B65G 1/0492
2016/0375814 A1   12/2016 Jochim
(Continued)

FOREIGN PATENT DOCUMENTS

| EP | 1348646 A2 | 10/2003 |
| WO | 2010100513 A2 | 9/2010 |
| WO | 2016199033 A1 | 12/2016 |

OTHER PUBLICATIONS

International Search Report dated Jul. 4, 2018 for corresponding International Application No. PCT/EP2018/059024, filed Apr. 9, 2018.

(Continued)

*Primary Examiner* — Thomas Randazzo
(74) *Attorney, Agent, or Firm* — David D. Brush; Westman, Champlin & Koehler, P.A.

(57) ABSTRACT

An order picking system includes an automatic guided trolley for picking objects for an order in at least one shelving and having at least two running wheels and gear wheel supports cooperating with two pairs of uprights so as to allow the trolley to rise along the uprights. A stretched roller chain is fixed on each of the uprights, the chain extending substantially parallel to the longitudinal axis of the upright to which it is fixed to receive a tooth of the gear wheel cooperating with the upright to which it is fixed. Two adjacent rollers of the chain are spaced apart by the pitch value of the gear wheel. Each movable support has a securing element with one of the four uprights to maintain a predetermined distance between the axis of the gear wheel mounted on the movable support and the chain receiving the teeth of the gear wheel.

12 Claims, 6 Drawing Sheets

(56) References Cited

U.S. PATENT DOCUMENTS

2017/0121110 A1* 5/2017 Zombori .............. B65G 1/0492
2019/0071251 A1* 3/2019 Stefani ................ B65G 47/901

OTHER PUBLICATIONS

Written Opinion of the International Searching Authority dated Jul. 4, 2018 for corresponding International Application No. PCT/EP2018/059024, filed Apr. 9, 2018.

English translation of the International Written Opinion of the International Searching Authority dated Jul. 11, 2018 for corresponding International Application No. PCT/EP2018/059024, filed Apr. 9, 2018.

* cited by examiner

ORDER PICKING SYSTEM

1. CROSS-REFERENCE TO RELATED APPLICATIONS

This application is a Section 371 National Stage Application of International Application No. PCT/EP2018/059024, filed Apr. 9, 2018, the content of which is incorporated herein by reference in its entirety, and published as WO 2018/189110 on Oct. 18, 2019, not in English.

2. FIELD OF INVENTION

The field of invention is that of warehouse logistics and in particular the handling and transport of parts or products.

More precisely, the invention concerns an order picking system.

The invention has an application in automating the flow management of a warehouse, for example in an order-picking warehouse in a supply chain.

3. STATE OF THE ART

In the global supply chain, flow management and product handling within a warehouse play a decisive role.

Traditionally, a picker moves through the warehouse to collect each product of an order at its location on a shelf in a rack.

It can be seen that such an organisation implies that the picker walks long distances during a working day, which causes fatigue and waste of time when the journey is not optimised.

Another disadvantage is that the picker must know the layout of the warehouse perfectly so as not to waste time.

To limit fatigue due to travel, improve picking management, reduce order picking time and cost, an organisation of warehouses has been devised where products are transported by machines to order picking stations.

For example, it was proposed to implement conveyors to transport products from the shelves to the preparation stations in a warehouse.

A disadvantage of this known technique is that it requires a heavy and expensive infrastructure.

Another disadvantage of this technique is that it is complex and costly to develop.

Another disadvantage is that the conveyors are bulky, which results in a significant loss of useful storage space.

A technique is also known to move horizontally, along a shelf, a mast supporting an elevator that allows each level of the shelf to be reached, in order to pick up or deposit a bin.

A disadvantage of this technique lies that it is necessary to consider installing a shelf-mounted mast in the warehouse.

Another disadvantage of this known technique is that one or more conveyors must be provided at the end of each row of shelves to transport the containers picked up by the masts to the order picking area.

According to a similar principle, a technique is known consisting in the use of self-guided shuttles moving on traffic ways, formed by rails, arranged on several levels, each at the height of a shelf in a rack. To change levels, the shuttles use a dedicated elevator, located at the end of the rack. When a shuttle has picked up a bin from a shelf, it lowers it onto a conveyor at the bottom of the shelf.

A disadvantage of this known technique is that the shuttles cannot move from one rack to another, which requires a large number of shuttles.

Another disadvantage of this technique is that it requires expensive traffic ways and conveyors.

Another disadvantage of this technique is that the shuttles have to wait for the elevator to clear before they can access the conveyor, which slows down the order picking process.

In one variant, and to reduce the number of traffic ways, an elevator has been envisaged to be moved on a traffic way, to allow the shuttles to reach a few shelves above the level of the traffic way.

A disadvantage of this variant is that it is even more expensive and complex to implement.

It has also been suggested to transport shelves arranged in the warehouse to an order-picking area using robots. To do this, a robot comes under the rack and lifts it up to be able to transport it.

A disadvantage of this known technique is that it involves limiting the volume of storage in height, to allow preparers to take products at ground level on the one hand and to prevent the shelves from tipping over during transport on the other hand.

To increase the volume of goods stored in a warehouse, it was also considered to store the products directly in bins stacked vertically and grouped in a storage area.

Robots circulating at the top of the storage volume are used to extract the bins containing the objects or goods for a given order. When a robot has to pick up a bin that is not stored on the upper level, the robot unstacks successively, one after the other, the bins located above this bin. During this operation, the robot gradually replaces each unstacked bin in an empty compartment on the surface of the storage volume.

A disadvantage of this technique is that robots always handle a large number of bins to extract a single bin, which slows down the preparation of the order.

We also know, for example, from document U.S. Pat. No. 7,101,139 B1 or document US-A1-2012/0039693, a robot equipped with two retractable gear wheels on each side of its chassis. These gear wheels are intended to engage on vertical racks and pinions fixed to shelves, to allow the robot to rise between two shelves and reach, in a goods warehouse, a bin containing objects to be picked, or, in a car garage on a shelf, to the level of a motor vehicle to be lowered.

A disadvantage of this known robot technology with four retractable gear wheels cooperating with racks and pinions is its high cost, due to the need to equip each shelf with racks and pinions.

Another disadvantage of this technique is that the robot can remain blocked when going up or down, if the height progression of one of the four gear wheels on the racks and pinions is not perfectly identical, at all times, to that of the other gear wheels.

Another disadvantage of this technique is that the meshing of the gear wheels on the racks and pinions is a major source of noise.

4. SUMMARY

An exemplary aspect of the present disclosure relates to an order-picking system comprising two pairs of uprights secured to two separate shelvings delineating a centre aisle and an automatically guided vehicle with at least two running wheels for picking up objects of an order from at least one of the shelves and motorised climbing means capable of cooperating with the uprights so as to enable the vehicle to rise along the uprights, the climbing means comprising four gear wheels of substantially parallel axes, each intended to cooperate with one of the four uprights, the axes of the gear wheels being substantially orthogonal to the axes of the running wheels, each of the gear wheels being mounted on a support that can be moved relative to the chassis of the vehicle between two positions:

a spaced apart position in which at least part of the gear wheel mounted on the support protrudes laterally out of the alignment of the chassis;

a retracted position, in which the gear wheel mounted on the support is facing the chassis;

According to the invention, a substantially stretched roller chain is fixed on each of said uprights, said chain extending substantially parallel to the longitudinal axis of the upright to which it is fixed and being intended to receive at least one tooth of the gear wheel cooperating with the upright to which it is fixed, two adjacent rollers of said chain being substantially spaced apart by the pitch value of said gear wheel, and each movable support has securing means with one of said four uprights configured so as to maintain a predetermined distance between the axis of the gear wheel mounted on said movable support and the chain receiving the teeth of said gear wheel.

The invention therefore concerns a system that makes it possible to limit human intervention to the mere packing of the ordered goods, thanks to at least one automatic guided vehicle that picks up the ordered objects from the shelves and transports them to an order-picking area where an operator puts them in cardboard boxes.

This vehicle is advantageously configured so that it can climb, i.e. climb by grasping, on two pairs of uprights simply fixed or integrated to two separate shelvings on either side of an aisle, to ascend while straddling these two parallel shelvings.

In addition, the climbing means allow the vehicle to remain constantly in contact with the upright(s) when going up or down and to keep the vehicle substantially horizontal, which prevents the bin or object carried by the vehicle from falling.

The two movable supports also allow the vehicle to slide between two uprights on either side of an aisle, when the movable supports are retracted, and then, by moving the movable supports apart, to climb along the pairs of uprights.

In addition, roller chains make it possible to have a "climbing ladder" for shelvings at a lower cost. This "ladder" is particularly easy to maintain, because it is sufficient, in the event of localised wear of a link, to change the link concerned. In addition, it is simpler and less expensive to change a chain rather than a complete upright when wear is distributed.

It should be noted that in the context of the invention, gear wheel means a gear wheel forming a single-block assembly or an assembly consisting of two pulleys on which a toothed belt is mounted.

It should also be noted that in the context of the invention, the distance between the chain and the gear wheel axle is defined as the distance between the longitudinal axis of the chain and the gear wheel axis of rotation measured in a direction normal to the longitudinal axis of the chain.

According to an exemplary embodiment of the invention, each of the said chains is fixed substantially at both ends of one of the said uprights.

According to an advantageous embodiment of the invention, a system as described above comprises means for adjusting the position of at least one of means for fixing at least one of said chains substantially at one end of one of said uprights, along the longitudinal axis of said upright, intended to allow said chain to be stretched.

This allows the chain to be re-tensioned when it has relaxed during maintenance operations.

According to a particularly advantageous embodiment of the invention, said means for adjusting the position of at least one of the fixing means comprise a spring.

Thus, the chain tension can be kept constant by the spring when the chain is extended, without an operator having to intervene to adjust the tension of the chain.

According to a particular embodiment of the invention, said means for securing each movable support to one of said four uprights comprise at least one support wheel and a counter-wheel of axes parallel to the axis of the gear wheel mounted on the movable support, suitable for rolling on one of said uprights.

Thus, by clamping a wall of the upright between the support wheel and the counter-wheel, a constant distance is maintained between the gear wheel and the tensioned chain. The lateral position of the vehicle between the two shelvings is thus kept constant, which prevents the teeth of the gear wheels or the notches of the belts from rubbing through the chain on the upright and limits the occurrence of premature wear.

According to an advantageous aspect of the invention, said movable supports are mounted substantially at the four ends of the chassis of said vehicle.

The mass of the vehicle, whether loaded or not, is distributed over the four corners of the chassis, which limits overhang and reduces the forces exerted on the means for securing the supports to the uprights.

According to an advantageous embodiment of the invention, said upright comprises a longitudinal groove suitable for receiving said chain.

This way the chain can be held laterally in the groove and does not deflect under the pressure of the vehicle.

According to a particular aspect of the invention, said upright comprises at least one aisle extending substantially perpendicular to the longitudinal axis of said upright, said support wheel bearing upon one side of said aisle and said counter-wheel bearing upon an opposite side of said aisle.

According to a particular aspect of the invention, the upright is an omega-profiled rail.

According to a particular embodiment of the invention, an order-picking system as described above comprises means for fixing the upright to the shelving.

In a particular embodiment of the invention, the uprights are fixed to the ground near one or more shelvings.

In an exemplary embodiment, the vehicle has means for gripping an object storage bin.

The vehicle can independently pick up or place a bin on the shelf of a rack at its storage location, without outside intervention, including human intervention.

Such gripping means may include, for example, a telescopic shovel, telescopic side arms and/or a telescopic fork equipped with a finger to push or pull a bin.

According to an advantageous embodiment of the invention, an order-picking system such as one of those described above comprises means for braking climbing equipment.

In this way, the descent of the vehicle is secured, when it fails, and in particular when the electric battery supplying the motors of the climbing equipment is discharged.

The braking system can be of the "viscous" type in a particular embodiment of the invention and obtained by magnetic braking, by shunting the armature of the motor.

According to an exemplary embodiment of the invention, the braking means comprise a tensioning roller pressing on a drive belt of a driven pulley integral with at least one gear wheel, the tensioning roller falling in the event of a break in the drive belt in a position so as to frictionally lock the driven pulley.

According to an exemplary embodiment of the invention, the distance between the uprights of the same shelving is essentially identical to the distance between two gear wheels of the supports mounted on the same side of the vehicle.

According to a particular embodiment of the invention, the uprights are shelving uprights.

This simplifies installation and reduces costs.

According to a particular embodiment of the invention, at least one of the rolling wheels and the motorised climbing means are driven by the same motor.

This results in a lightweight system that is particularly easy to operate.

Advantageously, a system as described above includes two independent motors, each designed to drive one of the pairs of gear wheels.

Thus, the two pairs of gear wheels can rotate at different speeds to keep the vehicle horizontal, if there are dimensional differences between the links of the chains installed on each side of the centre aisle.

5. LIST OF FIGURES

Other features and advantages of the invention will appear more clearly on reading the following description of an embodiment of the invention, given as a simple illustrative and non-limiting example, and the appended drawings among which:

Figure 1:
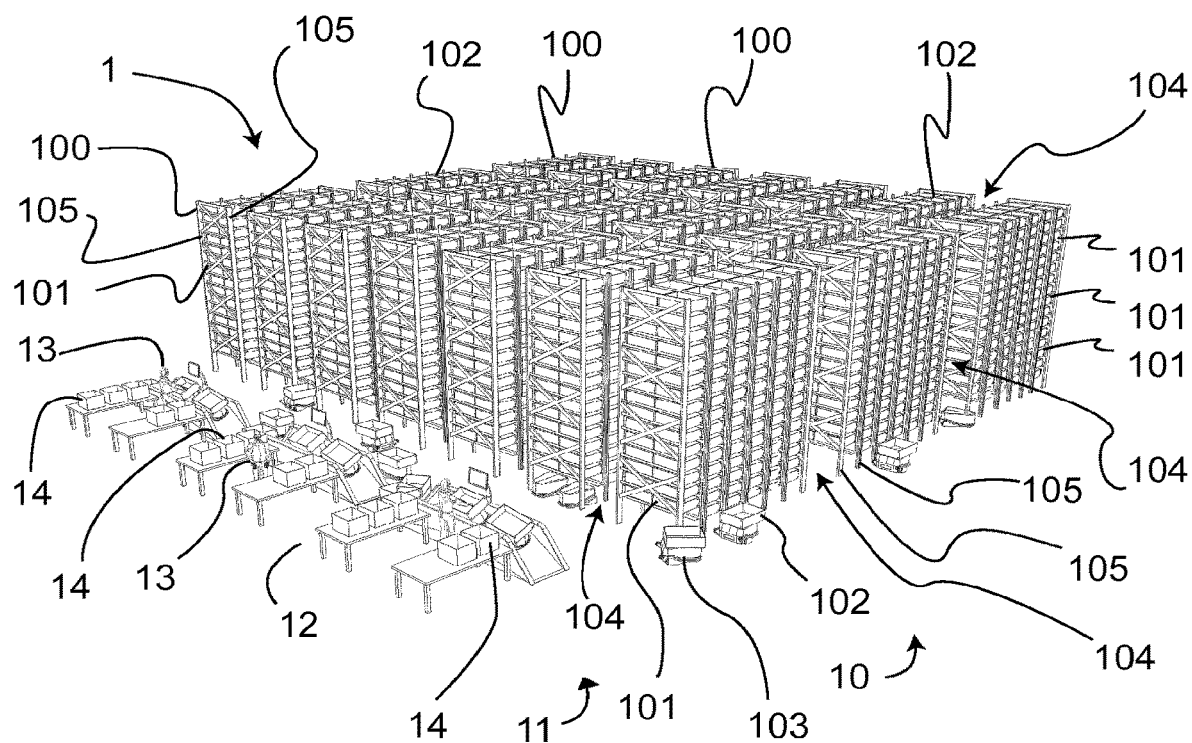
FIG. 1 is a schematic view, in perspective of a warehouse equipped with an exemplary embodiment of an order picking system according to the invention.

6. DETAILED DESCRIPTION OF THE INVENTION 6.1. First Exemplary Embodiment of the Invention FIG. 1 shows a warehouse 1 for storing products for shipment. This warehouse is divided into a storage area 10 and an order picking area 11.

The picking area 11 comprises order picking stations 12 on which operators 13 prepare packages 14 with the products of an order.

The storage area 10 is organised into shelvings 100 with shelves on several levels 101 supported by uprights 105, shelves on which are stored bins 102 that contain the stored products or articles.

A fleet of automatic guided vehicles 103 ensures the transport of the bins 102 between the storage area 10 and the order picking stations 12.

Each robot 103 receives the location information of the bin 102 containing the item to be picked up, to complete an order processed by one of the operators 13. The robot 103 goes to the location where the bin 102 is located and takes it out of the shelve 101 of the shelving 100 specified by the location information received. Then, the robot 103 transports the bin 102 from the shelving 100 via aisles 104 to the order picking station 12. The operator 13 only has to pick the quantity of items ordered and pack them. The robot 103 then returns the bin 102 to its location in the storage area 10.

The shelvings 100 are identical and arranged in parallel. The space between two shelvings 100 forms a span 104 which serves as a centre aisle for robots 103.

Figure 2:
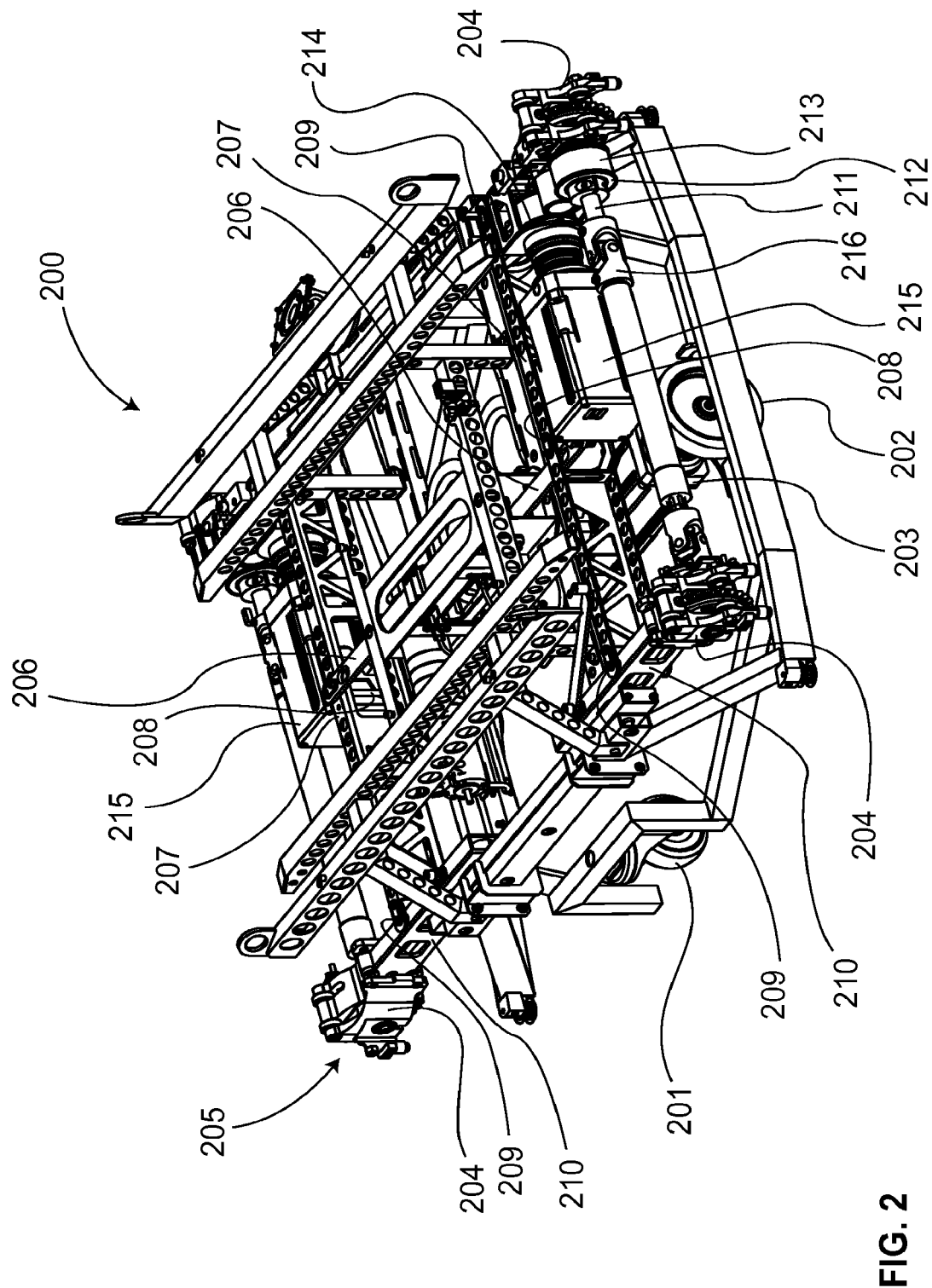
FIG. 2 is a schematic perspective representation of an automatic guided vehicle used in the warehouse illustrated with reference to FIG. 1.

FIG. 2 shows a robot 103 consisting of a chassis 200 that is carried by two idle wheels 201 and towed by two drive wheels 202 powered by motors 203 which are independent from each other. Thus, on a substantially flat and horizontal ground, the self-guided vehicle 103 can follow straight, curved paths and revolves around itself depending on the rotation control of the motors 203.

To climb shelvings 100, the chassis of the robot 103 is equipped, approximately at the four ends of the chassis, with a retractable climbing module 204. The extension and retraction of these climbing modules 204 is powered by a motor (not shown) that translates two lateral telescopic forks 205 carrying the climbing modules 204 between a spaced apart position and a retracted position.

Thus, the robot 103 can be mounted on uprights of two parallel shelvings 100 facing each other, distributing its weight over the four uprights 105.

Each side telescopic fork 205 consists of a control rod 206, a deflection rod 207 and two sliding arms 210, each carrying a climbing module 204.

For each telescopic fork 205, the deflection rod 207 is held in its centre by a pivot link using a first so-called central axis 208 with the distal end of the substantially perpendicular control rod 206. In addition, the deflection rod 207 at each distal end is pivotally connected by a second axis 209 to a sliding arm 210.

Thanks to these pivot links, the robot tolerates a variation in the distance between the uprights 105 of the shelvings 100 to be climbed. These pivot links also make it possible to correct a deviation in parallelism between the longitudinal axis of the robot 103 and each pair of uprights 105. Indeed, the successive contact of the climbing modules of the same fork, followed by a simultaneous thrust, allows the position deviation to be corrected. This mechanism is supplemented by a gap compensation device between the uprights 105 (not shown in FIG. 2), which will be described in more detail below in FIG. 8.

Each telescopic fork 205 is also equipped with a drive system for two climbing modules 204 located on the same side of the chassis. This drive system consists of a drive shaft 211 with a driven pulley 212 attached to it, and is connected at each end to a gear wheel of a climbing module 204 (visible in the detail view in FIG. 4).

The driven pulley 212 is driven by a toothed belt 213 which transmits the movement of a driving pulley 214 driven by a climbing motor 215. In addition, the transmission shaft 211 is equipped with a cardan shaft 216 with two seals that allows a lateral position deviation between the two climbing modules 204 of the telescopic fork 205, which allows a constant velocity transmission to be achieved.

Each climbing motor 215 is independently controlled by a motor shaft position control module (not shown in FIG. 2), to ensure that the robot 103 remains horizontal and the load does not fall. Thus, the control module adapts the speed of each motor 215 to compensate for the deviation between the rollers of the chains fixed on each upright 105, whose length may vary during their manufacture, taking into account manufacturing tolerances.

It should be noted that, on 10 to 12 meters long uprights 105, equipped with chains of the same type, the position difference between the end rollers of two chains can reach 20 mm.

Figure 3:
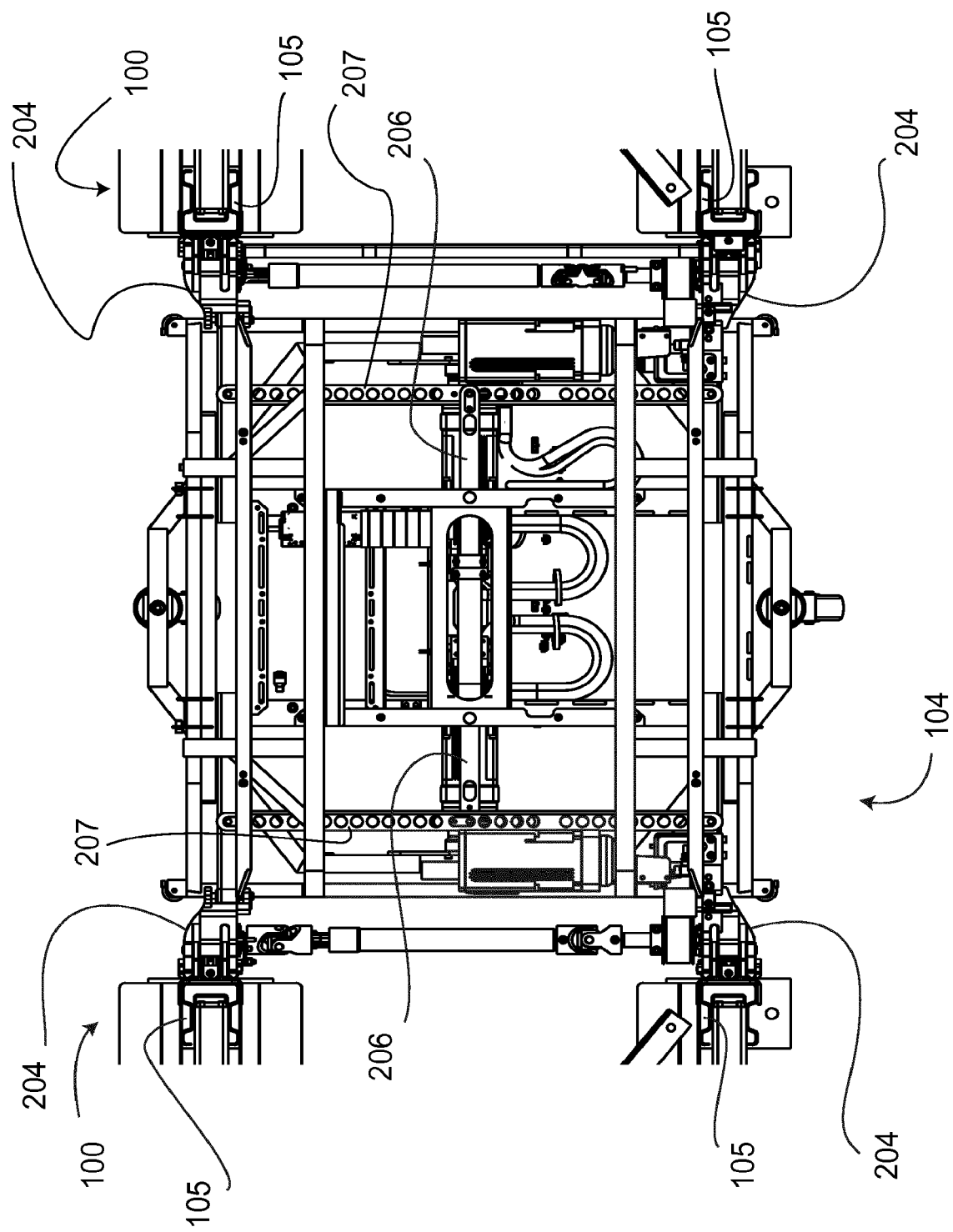
FIG. 3 is a top view in which the vehicle presented in reference to FIG. 2 climbs against two parallel shelvings.

FIG. 3 shows a robot 103 in top view, while climbing two shelvings 100 using the four climbing modules 204 which cooperate with two pairs of uprights 105 of the two substantially parallel shelvings 100 which delineate the aisle 104.

The robot 103 is equipped with a system for translating the telescopic forks 205 between a spaced apart position and a retracted position. This translation system consists of two pulleys and a toothed belt (not shown in FIG. 3) attached to the chassis in the median transverse plane of the robot 103. In addition, on each opposite strand of this toothed belt is fixed the proximal end of one of the two control rods 206. To extend or retract the climbing module 204, the driving pulley, driven by a fork control motor 205 (not shown in FIG. 3), drives the toothed belt that controls the translation of the climbing module 204.

It is therefore the direction of rotation of the stepper motor controlled by a module for controlling the position of the shaft of the fork control motor 205 (not shown in FIG. 3) that allows the climbing modules 204 to be moved between the retracted position for ground travel and the spaced apart position for climbing on the shelvings.

Thus, the climbing modules 204 extend or retract simultaneously on both sides or lateral sides of the robot 103. In addition, if the climbing modules 204 of a telescopic fork 205 come into contact with the uprights 105 on either side of the aisle 104 before the other, due to a centring deviation of the robot 103 in the aisle 104, the pressure exerted by the telescopic fork 205 will redirect the robot 103 between the uprights 105 on either side of aisle 104.

Figure 4:
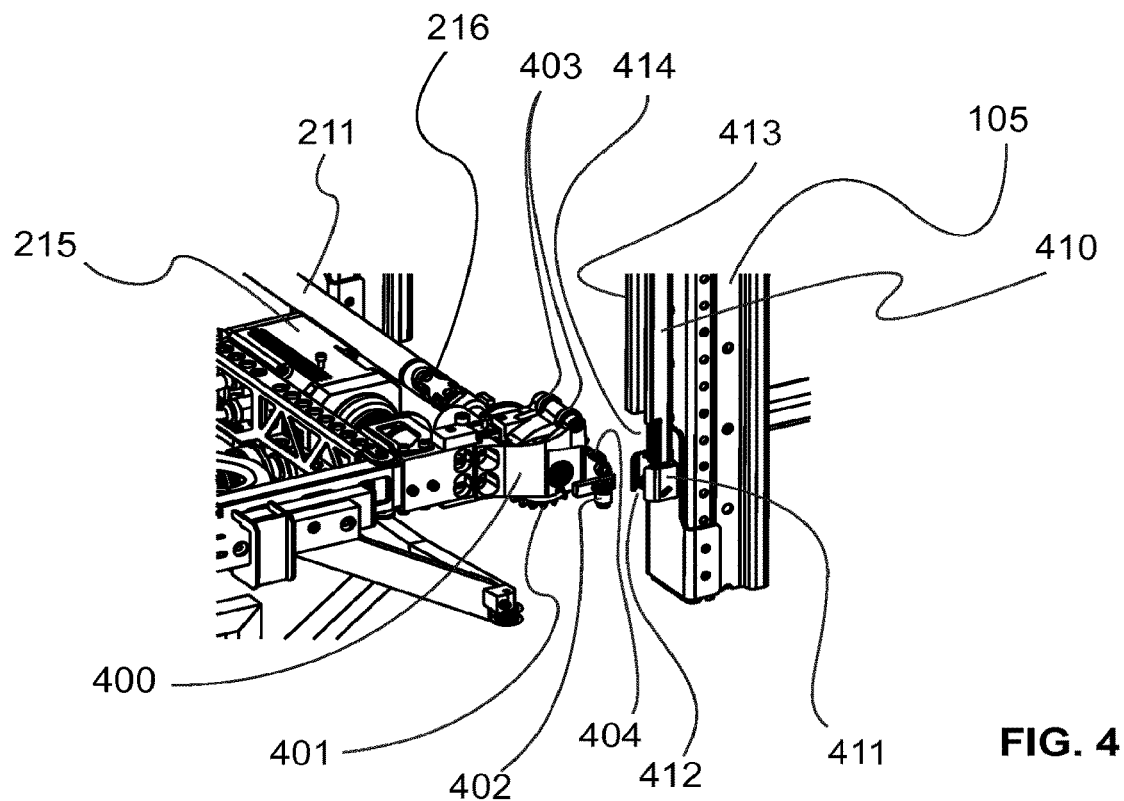
FIG. 4 is a detailed view of the base of a shelving upright shown with reference to FIG. 1.
Figure 5:
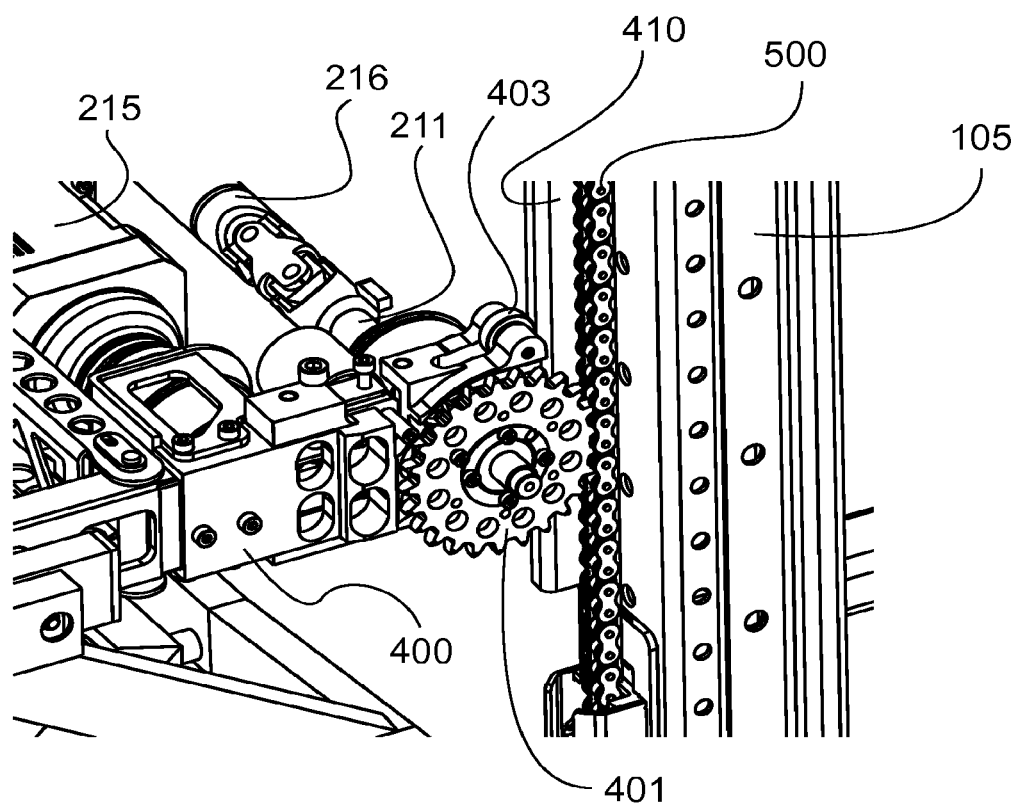
FIG. 5 is a detailed cross-sectional view of a climbing module of the vehicle presented with reference to FIG. 2.
Figure 6:
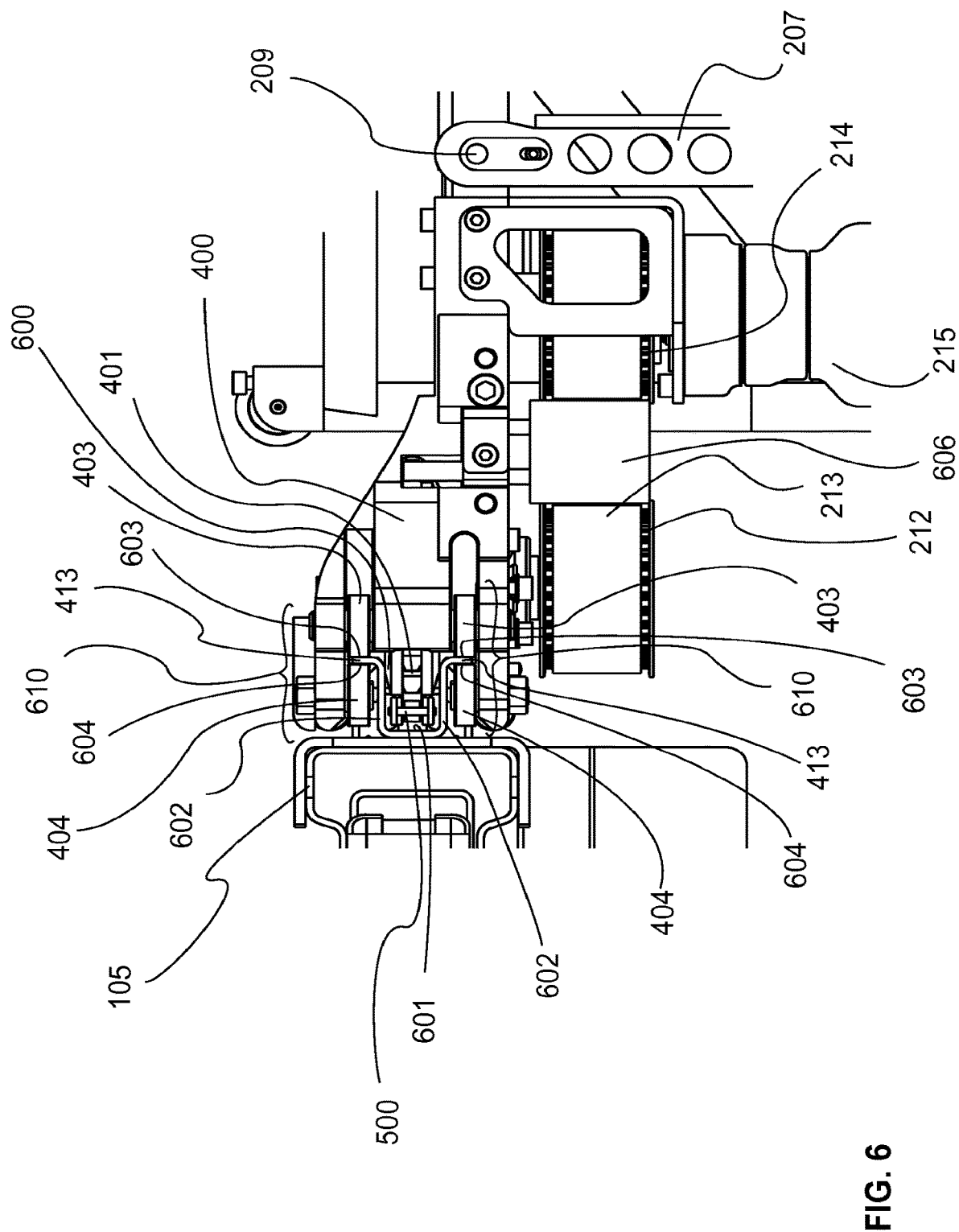
FIG. 6 is a top view of a vehicle climbing module that cooperates with an upright of the shelvings shown in reference to FIG. 1.

FIGS. 4 to 6 show in more detail the climbing module 204 and the upright 105 to which an Omega ("Ω") profiled rail 410 is attached. As shown in FIG. 4, each climbing module 204 includes a base 400 which supports a gear wheel 401, a centring wheel 402, two support wheels 403 and two counter-wheels 404.

In addition, it should be noted that the base of the profiled rail 410 is held in a support 411 which includes a groove 412 on the front to guide the centring wheel 402 of the climbing module 204 when it is extended, in order to centre and thus guarantee the position of the climbing module in relation to the profiled rail 410.

In addition, the profiled rail 410 is at its base reduced to a U-shaped profile forming a clearance 414 in this section to allow the two counter-wheels 404 of the climbing module 204 to pass behind the aisles 413. This centring wheel 402 therefore guarantees the relative position of the gear wheel 401, the two support wheels 403 and the two counter-wheels 404 with respect to the "Ω" profiled rail 410.

In FIG. 5, which is a cross-sectional view of the retractable climbing module 204 in the spaced apart position, the 401 gear wheel cooperates with the links of an ordinary roller chain 500, held tight at the bottom of the Omega profiled rail 410. For this purpose, the first end of the roller chain 500 is bolted to a hooking point (not shown in the figures) at the base of the profiled rail 410 used as the origin point for climbing or moving according to axis Y. The second end of the chain is substantially secured to the top of the profiled rail 410 by a second bolt. The position of this second bolt is adjustable to correct the chain tension 500 whose length increases with the operating time.

As can be seen in more detail from above in FIG. 6, the profiled rail 410 has a groove 600 delineated by a bottom 601 which is substantially perpendicular to two flanks 602 higher than the diameter of a counter-wheel 404 and parallel to each other.

In addition, each side wall 602 is extended by an aisle 413 which extends substantially perpendicularly in a transverse orientation from the flank 602 to the outside of the profiled rail 410. In addition, each flank 602 has a greater width than the width of the support wheels 403 and the counter-wheels 404, thus forming a front support face 603 or a rear support face 604 for these wheels 403, 404.

In FIG. 6, the climbing module 204 is shown in a spaced apart position where the gear wheel 401 is engaged on the chain 500. In this climbing configuration, each wheel 403 is supported on the front face 603 of a first aisle 413 while each counter-wheel 404 is supported on the rear face 604 of a second aisle 413 of the "Ω" profiled rail 410. It can therefore be seen that the front 603 and rear 604 faces of an aisle 413 form a runway pinched by the assembly 610 formed by the support wheel 403 and the counter-wheels 404. Thus, each assembly 610 guides and maintains the relative position of the climbing module 204 with respect to the profiled rail 410 and therefore that of the rotation axis of the gear wheel 401 with respect to that of the chain 500. The grippers 610 compensate for the low winding arc of the chain 500 on the gear wheel 401, well below the usual 90° minimum limit, by ensuring that the gear wheel 401 is constantly engaged with the chain 500.

To climb up the shelvings 401, the robot 103, after aligning itself with the uprights 105, deploys the four gear wheels 401, which allows the gear wheels 401 to engage with the chains 500 present in the profiled rails 410 of the four uprights 105. The rotation of the gear wheels 401 then allows the robot 103 to move vertically, which can climb up or down along the uprights 105.

To initiate climbing, the shaft position control module of the fork extension control motor 205 controls the extension of the climbing modules 204 so that the support wheels 403 exert pressure on the front face 603 of the aisles 413 of the profiled rails 410 until the counter-wheels 404 have crossed the clearance zone 414 to contact the rear face 604 on the reverse side of the aisles 413.

Thus, each gear wheel 401 remains engaged with the chain 500 due to the pressure exerted by the support wheels 403 on the profiled rail 410, which prevents the chain from coming off.

When clearance zone 414 is crossed, the motor shaft position control module reverses the direction of rotation of the fork control motor 205 by a fraction of a revolution smaller than the functional clearance of the transmission that must be caught up with when the direction of rotation of the motor is reversed in order to drive the belt in the opposite direction. The transverse movement of the forks 205 is then free in the interval of the functional clearance. In this way, the distance between two climbing modules 204 in the same transverse plane can vary slightly to compensate for variations in distances between two uprights 105 facing each other on either side of aisle 104. Each set 610 of each climbing module 204, then guarantees that each gear wheel 401 remains engaged with the chain 500 facing each other.

During descent, the motor shaft position control module instructs the fork control motor 205 to apply pressure to the profiled rails 410 near and inside the clearance area 414.

Figure 7:
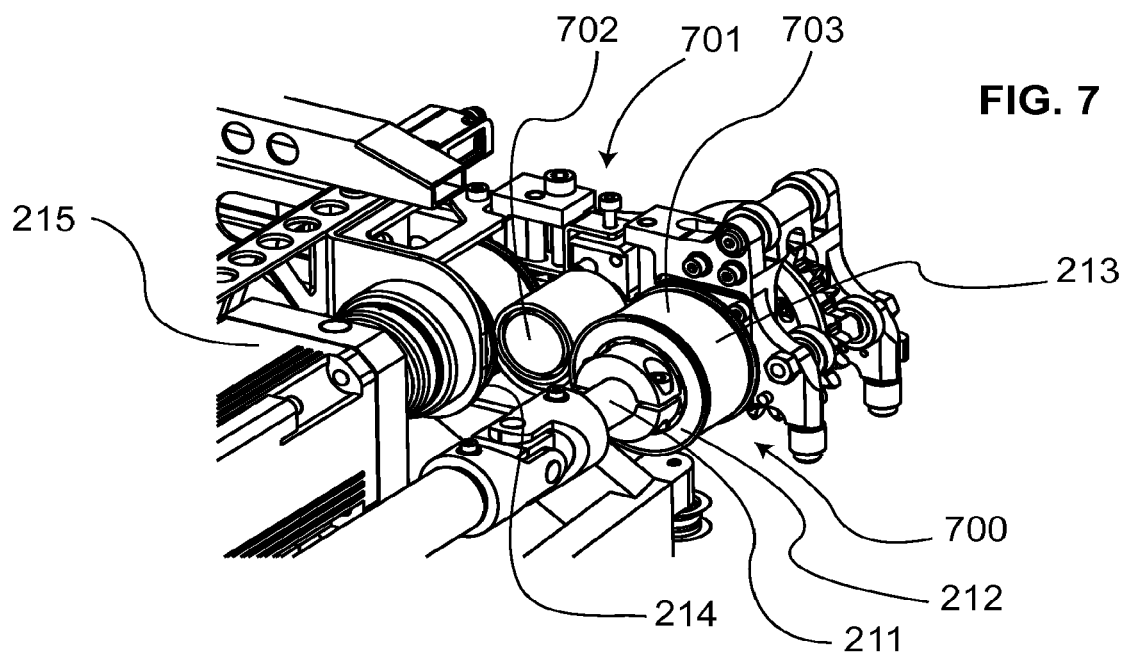
FIG. 7 is a detailed view of the drive system for the climbing modules of the vehicle presented with reference to FIG. 2.

As shown in FIG. 7, which is a detailed view of the drive system 700 of the two climbing modules 204 of each telescopic fork 205, the drive system 700 also comprises a clutch system 701 of the belt 213 with the driving pulley 214 and the driven pulley 212, using a tensioner roller 702. This tensioner roller 702 is mounted movably in a bracket above the toothed belt 213 to support the outer part of the upper belt 703. This tensioning roller 702 can be moved between three positions:
- a disengaged position in which the driving pulley 214 and the driven pulley 212 are decoupled, because the tensioner roller 702 is not in contact, therefore does not tension the belt 213;
- an engaged position corresponding to nominal operation, in which the roller 702 tensions the belt 213 and ensures proper transmission of torque from the motor 215 to the transmission shaft 211; and
- a safety position in the event of a breakage of the toothed belt 213, which causes the tensioner roller 702 to automatically fall off, coming into contact with the driven pulley 212 and blocking it by friction.

During normal operation, the roller 702 is in the engaged position to transmit the motor torque to the gear wheels 401.

If the robot 103 is blocked during an escalation, such as by a broken belt 213, maintenance personnel can then disengage the motor by manually disengaging the tension roller 702 in order to lower the robot 103.

Figure 8:
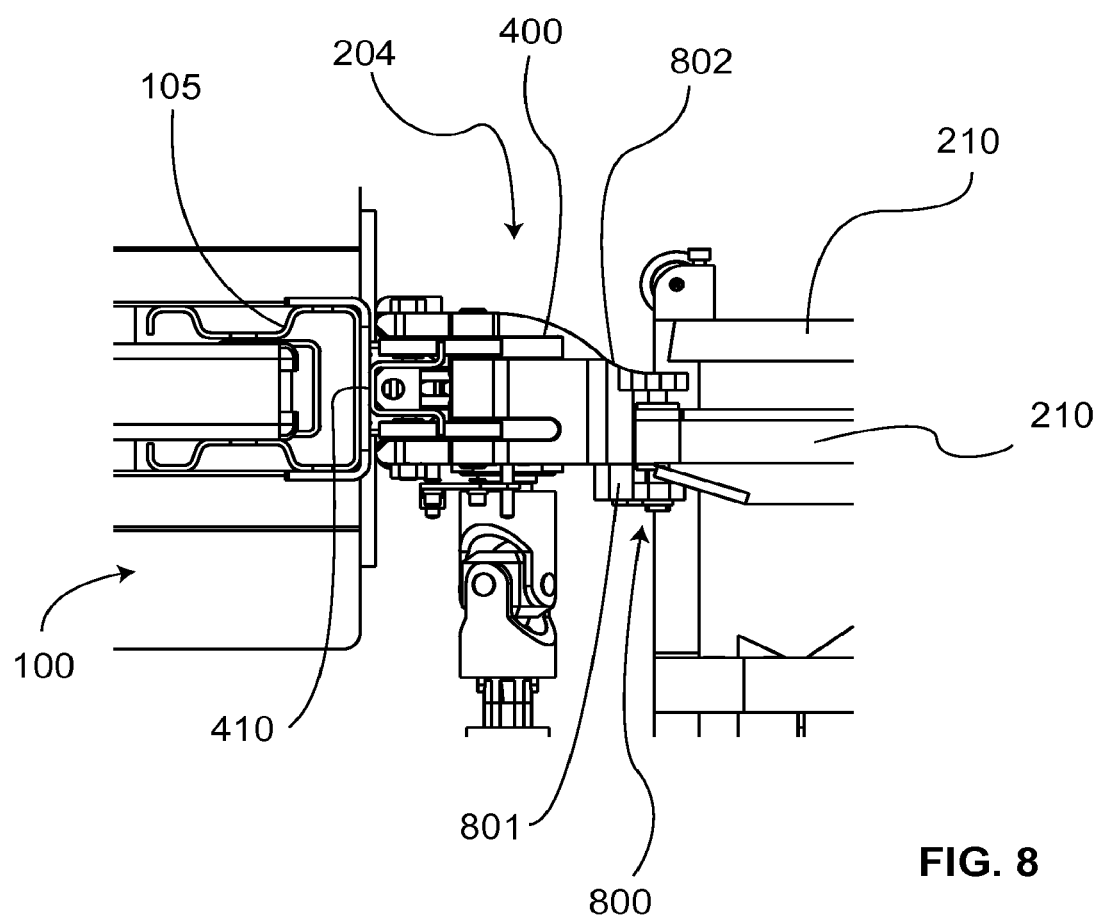
FIG. 8 is a detailed view of the device for compensating the gap between the two profiled rails fitted to a climbing module of the vehicle presented in reference to FIG. 2.

FIG. 8 shows in detail a compensation device 800 for the distance between the two profiled rails 410 of a pair of uprights 105 of a shelving 100, which is inserted between the end of the sliding arm 210 and the base 400 of the climbing module 204. Each telescopic fork 205 is equipped with a single compensation device 800 on the sliding arm 210 opposite the drive system (not shown in FIG. 8). The compensation device 800 consists of a slide 801 formed by a bearing connected to the sliding arm 210 and a slide 802 formed by an axis integral with the base 400, both sliding relative to each other over a length of one centimetre according to the longitudinal orientation of the robot 103.

Thanks to this articulation of the compensation device, the robot 103 tolerates a variation of +/−5 mm between the two profiled rails 410 of each pair of uprights 105.

6.2. Other Optional Features and Advantages of the Invention

In embodiment variants of the invention detailed above, the following can also be provided:
- fitting the automatic guided vehicle with two driving wheels centred on it, while two idle wheels are arranged on the periphery and ensure the stability of the vehicle. This geometry of the running gear is then coupled with a balance system that guarantees isostatism and distributes the weight of the robot and its load over all four wheels, regardless of ground imperfections;
- a braking device for the vehicle during descents;
- an automatic lowering of the vehicle in the event of an anomaly, for example in the event of a loss of electrical power. In this situation, the brakes are released, and the rate of descent to the ground is limited by exerting a magnetic field on the motor(s) of the climbing equipment, so as to create a viscous brake;
- a location at altitude, by recognising the shelvings that support bins, by recognising bins for example using an RFID chip (Radio Frequency Identification);
- fitting the automatic guided vehicle with a fork or telescopic shovel to lift, move and lower a bin or an object;
- fitting the automatic guided vehicle with telescopic side arms, or a telescopic fork with a finger at the end of which is mounted, for pushing or pulling bins, by sliding them onto their shelving;
- fitting the vehicle with a bin weighing scale to carry out an inventory of the contents of the bins;
- installing the uprights in the immediate vicinity of the shelvings, to allow the robot to move up and down along the shelvings, these uprights can be fixed to the ground or to a shelving;
- providing a profiled upright with a single side aisle associated with a climbing module that has a single support wheel and a single counter-wheel capable of cooperating with the single side aisle;
- rail-shaped profiled uprights whose bottom and flanks form a dovetail-shaped female footprint;
- fitting each climbing module with two parallel gear wheels and each upright with a double chain;
- providing at one end of the uprights means for adjusting the chain tension using a spring;
- uprights which have a groove in which to accommodate a chain and aisles for supporting the wheels of the climbing modules, on the outside of the uprights in relation to the shelving;
- providing for each climbing module at least one longitudinal guide wheel with an axis perpendicular to the gear wheel and capable of rolling on one flank of the profiled rail so as to substantially guarantee the centring of the gear wheel with respect to the chain of the profiled rail;
- a slide linked to the base and a ram 802 fixed to the sliding arm;
- a securing mechanisms including skids intended to slide on the uprights.

The examples of order picking systems described above can be used in different types of industrial environments, for example in an order picking supply centre or in a supply chain for spare parts or components in a production chain.

An exemplary embodiment of the invention therefore particularly aims to overcome the disadvantages of the state of the art mentioned above.

An exemplary embodiment of the invention aims to provide an order-picking technique that limits human intervention and is simple to implement.

An exemplary embodiment of the invention provides an inexpensive order-picking technique.

An exemplary embodiment of the invention provides a low-noise order-picking technique.

An exemplary embodiment of the invention provides an order-picking technique that can be easily adapted to changes in the storage area.

An exemplary embodiment of the invention provides a picking technique that is compatible with a dense storage area.

An exemplary embodiment of proposes such a technique that allows the use of shelving of different heights and/or orientations in the same warehouse.

An exemplary embodiment of the invention also provides an order-picking technique while using existing shelvings.

Another object of an exemplary embodiment of the invention is to provide an order-picking technique that is safe for operators.

Although the present disclosure has been described with reference to one or more examples, workers skilled in the art will recognize that changes may be made in form and detail without departing from the scope of the disclosure and/or the appended claims.

The invention claimed is:

1. An order picking system comprising:
   first and second pairs of uprights each pair attached to two separate shelvings delineating a centre aisle;
   an automatic guided vehicle having a chassis, at least two running wheels for picking up objects for an order in at least one of said shelvings, and a motorised climbing module, which cooperates with said uprights so as to allow said vehicle to rise along said uprights,
   said climbing module comprising first, second, third and fourth gear wheels of substantially parallel axes, each gear wheel cooperating with one of the uprights, the axes of the gear wheels being substantially orthogonal to axes of the running wheels,
      each of the gear wheels being mounted on a support that can be moved relative to the chassis of said vehicle between:
         a spaced-apart position in which at least a portion of said gear wheel mounted on said support protrudes laterally out of alignment with said chassis;
         a retracted position, in which the gear wheel mounted on said support is facing said chassis;
   a substantially stretched roller chain fixed on each of said uprights, said chain extending substantially parallel to a longitudinal axis of the upright to which it is fixed and receiving at least one tooth of the gear wheel cooperating with the upright to which it is fixed, first and second adjacent rollers of said chain being substantially spaced apart by a pitch value of said gear wheel,
   and wherein each movable support is secured with one of said uprights so as to maintain a predetermined distance between the axis of the gear wheel mounted on said movable support and the chain receiving the teeth of said gear wheel.

2. The order picking system according claim 1, wherein said movable supports are mounted substantially at first, second, third and fourth ends of the chassis of said vehicle.

3. The order picking system according to claim 1, wherein at least one of said uprights comprises a longitudinal groove adapted to receive said chain.

4. The order picking system according to claim 1, wherein at least one of said uprights is an omega profiled rail.

5. The order picking system according to claim 1, wherein said vehicle comprises a gripper configured to grip an object storage bin.

6. The order picking system according to claim 1, further comprising a brake for braking said climbing module.

7. The order picking system according to further comprising first and second independent motors each driving one of pair of the gear wheels.

8. The order picking system according to claim 1, further comprising a securing mechanism for securing each movable support to one of said four uprights, which comprises at least one support wheel and a counter-wheel of axes parallel to the axis of the gear wheel mounted on the movable support, suitable for rolling on one of said uprights.

9. The order picking system according to claim 8, wherein at least one of said uprights comprises at least one aisle extending substantially perpendicular to the longitudinal axis of said upright, said support wheel bearing upon one side of said aisle and said counter-wheel bearing upon an opposite side of said aisle.

10. The order picking system according to claim 1, wherein each of said chains is attached substantially to both ends of one of said uprights.

11. The order picking system according to claim 10, further comprising an adjustment mechanism, which adjusts a position at which at least one of said chains is fixed substantially at one end of one of said uprights, along the longitudinal axis of said upright, allowing said chain to be stretched.

12. The order picking system according to claim 11, wherein said adjusting mechanism comprises a spring.

* * * * *

UNITED STATES PATENT AND TRADEMARK OFFICE
CERTIFICATE OF CORRECTION

PATENT NO. : 10,822,169 B2
APPLICATION NO. : 16/488818
DATED : November 3, 2020
INVENTOR(S) : Romain Moulin et al.

Page 1 of 1

It is certified that error appears in the above-identified patent and that said Letters Patent is hereby corrected as shown below:

In the Claims

Column 11, Claim 2, Line 38:
Please insert --to-- between words "according" and "claim."

Signed and Sealed this
Thirteenth Day of July, 2021

Drew Hirshfeld
*Performing the Functions and Duties of the*
*Under Secretary of Commerce for Intellectual Property and*
*Director of the United States Patent and Trademark Office*